(12) United States Patent
Wilcox et al.

(10) Patent No.: US 9,155,996 B2
(45) Date of Patent: Oct. 13, 2015

(54) SORBENTS FOR CARBON DIOXIDE CAPTURE

(71) Applicant: Board of Trustees of the Leland Stanford Junior University, Palo Alto, CA (US)

(72) Inventors: Jennifer Wilcox, Half Moon Bay, CA (US); T. Daniel P. Stack, Stanford, CA (US); Zhenan Bao, Stanford, CA (US); Brannon Gary, Stanford, CA (US); Jiajun He, Stanford, CA (US); John To, Stanford, CA (US)

(73) Assignee: Board of Trustees of the Leland Stanford Junior University, Palo Alto, CA (US)

(*) Notice: Subject to any disclaimer, the term of this patent is extended or adjusted under 35 U.S.C. 154(b) by 0 days.

(21) Appl. No.: 14/213,859

(22) Filed: Mar. 14, 2014

(65) Prior Publication Data

US 2014/0286844 A1  Sep. 25, 2014

Related U.S. Application Data

(60) Provisional application No. 61/785,991, filed on Mar. 14, 2013.

(51) Int. Cl.
*B01D 53/62* (2006.01)
*B01D 53/85* (2006.01)
*B01J 20/02* (2006.01)
*B01J 20/20* (2006.01)
*B01D 53/02* (2006.01)

(52) U.S. Cl.
CPC ............... *B01D 53/62* (2013.01); *B01D 53/02* (2013.01); *B01D 53/85* (2013.01); *B01J 20/024* (2013.01); *B01J 20/20* (2013.01); *B01D 2253/102* (2013.01); *B01D 2253/1122* (2013.01); *B01D 2257/504* (2013.01); *Y02C 10/02* (2013.01); *Y02C 10/04* (2013.01); *Y02C 10/08* (2013.01)

(58) Field of Classification Search
CPC ............. B01D 2253/102; B01D 2253/1122; B01D 2257/504; B01D 53/02; B01D 53/62; B01D 53/85; B01J 20/024; B01J 20/20
See application file for complete search history.

(56) References Cited

U.S. PATENT DOCUMENTS

| | | | | | |
|---|---|---|---|---|---|
| 3,078,638 | A | * | 2/1963 | Milton | 95/139 |
| 3,982,912 | A | * | 9/1976 | Yatsurugi et al. | 95/116 |
| 4,604,270 | A | * | 8/1986 | Tom | 423/210 |
| 4,775,396 | A | * | 10/1988 | Rastelli et al. | 95/95 |
| 4,957,715 | A | * | 9/1990 | Grover et al. | 423/228 |
| 6,080,226 | A | * | 6/2000 | Dolan et al. | 95/100 |
| 6,652,626 | B1 | * | 11/2003 | Plee | 95/96 |
| 8,491,705 | B2 | * | 7/2013 | Choi et al. | 95/139 |
| 2009/0143227 | A1 | * | 6/2009 | Dubrow et al. | 502/406 |
| 2009/0211445 | A1 | * | 8/2009 | Mirkin et al. | 95/130 |

(Continued)

OTHER PUBLICATIONS

Chen, Z. P. et al., "Three-dimensional flexible and conductive interconnected graphene networks grown by chemical vapor deposition," Nat. Mater., 2011, 10 (6), p. 424-428.

(Continued)

*Primary Examiner* — Christopher P Jones
(74) *Attorney, Agent, or Firm* — Foley & Lardner LLP; Cliff Z. Liu

(57) ABSTRACT

Provided herein are sorbents for carbon dioxide ($CO_2$) capture, such as from natural gas and coal-fired power plant flue gases, and uses thereof.

15 Claims, 8 Drawing Sheets

(56) References Cited

U.S. PATENT DOCUMENTS

| | | | |
|---|---|---|---|
| 2010/0132549 A1* | 6/2010 | Yaghi et al. | 95/128 |
| 2010/0180771 A1* | 7/2010 | Liu et al. | 96/141 |
| 2010/0186588 A1* | 7/2010 | Yaghi et al. | 95/127 |
| 2011/0168018 A1* | 7/2011 | Mohamadalizadeh et al. | 95/136 |
| 2012/0172612 A1* | 7/2012 | Yaghi et al. | 556/132 |
| 2012/0312164 A1* | 12/2012 | Inubushi et al. | 95/121 |
| 2013/0042758 A1* | 2/2013 | Li et al. | 95/139 |
| 2013/0139686 A1* | 6/2013 | Wilmer et al. | 95/127 |
| 2013/0143768 A1* | 6/2013 | Wilmer et al. | 506/12 |

OTHER PUBLICATIONS

Cooper, R.J., et al., "The assembly of rotaxane-like dye/cyclodextrin/surface complexes on aluminium trihydroxide or goethite," Dalton Transactions, 2006(23): p. 2785-2793.

D'Alessandro, D., et al., "Carbon dioxide capture: prospects for new materials," Angew. Chem., Int. Ed, 2010. 49: p. 6058-6082.

Devadoss, A. et al., "Azide-modified graphitic surfaces for covalent attachment of alkyne-terminated molecules by 'click' chemistry," J. Am. Chem. Soc., 2007, 129 (17), p. 5370.

Duchateau et al., "Silica-Grafted Diethylzinc and a Silsesquioxane-Based Zinc Alkyl Complex as Catalysts for the Alternating Oxirane-Carbon Dioxide Copolymerization," Organometallics, 2007, 26 (17), p. 4204-4211.

Hicks, J.C., et al., "Designing Adsorbents for $CO_2$ Capture from Flue Gas-Hyperbranched Aminosilicas Capable of Capturing $CO_2$ Reversibly," Journal of the American Chemical Society, 2008, 130(10): p. 2902-2903.

Kim, J. et al., "Direct synthesis of uniform mesoporous carbons from the carbonization of as-synthesized silica/triblock copolymer nanocomposites," Carbon, 2004, 42 (12-13), p. 2711-2719.

McCann, N., et al., "Prediction of the overall enthalpy of $CO_2$ absorption in aqueous amine systems from experimentally determined reaction enthalpies," Energ. Proc., 2011.4: p. 1542-1549.

Mulgundmath, V.P., et al., "Adsorption and separation of $CO_2/N_2$ and $CO_2/CH_4$ by 13X zeolite," The Canadian Journal of Chemical Engineering, 2012. 90(3): p. 730-738.

Nelson, P. A. et al., "Mesoporous Nickel/Nickel Oxide: A Nanoarchitectured Electrode," Chem. Mater. 2002, 14 (2), p. 524-529.

Ruthven, D.M., Principles of adsorption and adsorption processes, 1984, Wiley-Interscience.

Vinoba, M., et al., "Biomimetic Sequestration of $CO_2$ and Reformation to $CaCO_3$ Using Bovine Carbonic Anhydrase Immobilized on SBA-15," Energy Fuels, 2011, 25, p. 438-445.

Wilcox, J. et al., "Surface Functionalization of Mesoporous Silica-Based Sorbents for $CO_2$ Capture," 2012, http://gcep.stanford.edu/pdfs/TechReports2013/2.4.2_Wilcox_Public_Version_2013.pdf.

Yuan et al., "Highly Ordered Mesoporous Carbon Synthesized via in Situ Template for Supercapacitors," Int. J. Electrochem. Sci., 2009, 4 (4), p. 562-570.

Zhao, D., et al., Triblock Copolymer Syntheses of Mesoporous Silica with Periodic 50 to 300 Angstrom Pores. Science, 1998. 279(5350): p. 548-552.

* cited by examiner

SORBENTS FOR CARBON DIOXIDE CAPTURE

CROSS-REFERENCE TO RELATED APPLICATION

This application claims the benefit of U.S. Provisional Application Ser. No. 61/785,991, filed on Mar. 14, 2013, the disclosure of which is incorporated herein by reference in its entirety.

FIELD OF THE INVENTION

This disclosure generally relates to sorbents for carbon dioxide ($CO_2$) capture, such as from natural gas and coal-fired power plant flue gases, and uses thereof.

BACKGROUND

The current state-of-the art technology for $CO_2$ capture at scale is amine scrubbing, a chemical absorption-based technology. Another option for $CO_2$ capture is an adsorption-based technology, where $CO_2$ is captured and separated by solid sorbents. Current adsorption-based technologies for $CO_2$ capture employ zeolites and metal-organic frameworks that have difficulty in selectively removing $CO_2$ from water in a flue gas stream. A challenge of sorbents such as zeolites and metal-organic frameworks is that they are based on a physical adsorption mechanism rather than a chemical adsorption mechanism, by which $CO_2$ is captured. In a physical adsorption-based mechanism, water can be preferentially adsorbed over $CO_2$ so that adsorption-based technologies relying on physical adsorption can require an additional operation to separate water from $CO_2$, and a resulting percentage of $CO_2$ captured is compromised as well.

It is against this background that a need arose to develop the embodiments described herein.

SUMMARY

One aspect of this disclosure relates to a sorbent. In some embodiments, the sorbent includes: (1) a support; and (2) functionalizing moieties bound to the support, where at least one of the functionalizing moieties includes a zinc atom, and the sorbent is capable of $CO_2$ sorption.

Other aspects of this disclosure relate to a method adsorption of $CO_2$ by contacting the sorbent with $CO_2$, and a method of desorption of $CO_2$ by applying a pressure or temperature change to the sorbent.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Overview

Figure 1:
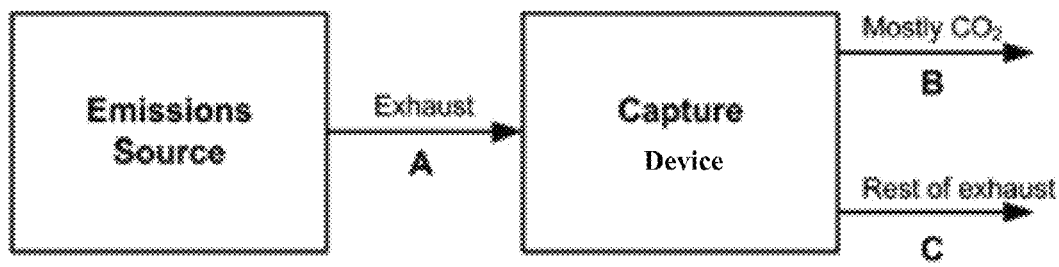
FIG. 1 graphically illustrates a schematic of $CO_2$ capture, according to an embodiment of this disclosure.

Sorbent technologies for $CO_2$ capture offer several benefits over amine-based solvent absorption approaches. For example, within an adsorption-based approach, a solvent can be absent, which decreases the energy requirements of regeneration since heating the solvent can be the greatest energetic expense associated with $CO_2$ capture using solvent-based approaches. Another benefit of sorbent technology is the flexibility associated with the choice in pore size and connectivity, in addition to the favorable heat conduction properties of materials such as carbon. Mesoporous supports formed of carbon or other materials allow for heat to be dissipated readily and uniformly during adsorption, which will lead to enhanced capacity for $CO_2$ capture, in addition to enhancing heat transfer into a support for regeneration. Furthermore, sorbent technologies can impose reduced environmental hazards compared to the corrosive alkanolamine solutions used in absorption approaches. Despite these benefits, challenges of sorbents such as zeolites and metal-organic frameworks are competition for water, which can be present at levels of about 10% to 20% (by moles) in a flue gas. While pre-dehydration of the flue gas can be considered, such a process increases the separation complexity with additional energy costs. The mesoporous structure for $CO_2$ capture of embodiments of this disclosure circumvents these challenges while leveraging the benefits of sorbent technologies.

In some embodiments, provided herein is a mesoporous structure for optimal heat transfer properties and controllable tortuosity to enhance sorption of $CO_2$. As used herein, "sorption" refers to one or more of adsorption and desorption. Adsorption typically refers to the adhesion of atoms, ions, or molecules to a surface. In contrast to absorption where a fluid absorbate permeates or is dissolved by a solid or liquid absorbent, in adsorption an adsorbate typically accumulates on a sorbent surface and, for example, can generate a film as a condensed phase. Adsorption can be divided into physical adsorption (physisorption) and chemical adsorption (chemisorption). Physisorption typically refers to the case in which sorbate molecules are held to a sorbent surface relatively loosely by weak intermolecular forces, while chemisorption typically takes place when sorbate molecules bind relatively strongly via covalent, ionic, or coordination bonding to adsorption sites. In some cases, physisorption takes place when a heat of adsorption is less than about 10-15 kcal/mol, while chemisorption occurs if the heat of adsorption is at least or greater than about 15 kcal/mol. Sorption of $CO_2$ in a mesoporous structure of some embodiments of this disclosure occurs at least partially, primarily, or substantially fully via chemisorption, or via a combination of chemisorption and physisorption.

In some embodiments, a mesoporous structure includes a support that includes or consists essentially of carbon or mesoporous carbon. In some embodiments, the mesoporous structure includes a support that includes or consists essentially of silica or mesoporous silica. In some embodiments, the mesoporous structure includes a support that includes or consists essentially of another mesoporous oxide. Examples of mesoporous oxides include mesoporous silica, mesoporous alumina, and mesoporous oxides of niobium, tantalum, titanium, zirconium, cerium, tin, and other metal and metalloids. In some embodiments, a support includes, or is surface functionalized with, one or more zinc (Zn) atoms or zinc-containing complexes or moieties, which can operate to capture $CO_2$ as carbonate or bicarbonate. Other metal atoms or complexes containing such metal atoms suitable for $CO_2$ capture are encompassed by this disclosure. In some embodiments, the support includes, or is surface functionalized with, one or more amines or amine-containing moieties. In some embodiments, the amines are primary amines, for example, of formula $RNH_2$, and, in some embodiments, the amines are secondary amines, for example, of formula $R_2NH$ or $RR'NH$. R and R' each can be a hydrocarbyl group having 1-20, 1-10, or 1-6 carbon atoms, which may be optionally substituted. R and R' each can be saturated or fully or partly unsaturated, and can include, for example, an aromatic group.

In some embodiments, provided herein is a mesoporous structure including a support and one or more functionalizing moieties, where the support includes one or more of mesoporous carbon and mesoporous silica or another mesoporous oxide, and the functionalizing moieties each includes a zinc atom or an amine, and where the functionalizing moieties are bound to a surface of the support. In some embodiments, the mesoporous structure is capable of $CO_2$ sorption.

In some embodiments, a mesoporous structure includes or defines pores, such as formed in a support, where the pores have an effective pore size that is less than about 2 micron (μm), or that is about 2 nanometer (nm) to about 50 nm, about 2 nm to about 40 nm, about 2 nm to about 30 nm, about 2 nm to about 20 nm, about 2 nm to about 10 nm, about 1 nm to about 10 nm, about 1 nm to about 5 nm, about 1 nm to about 4 nm, about 1 nm to about 3 nm, or about 1 nm to about 2 nm. An effective pore size can refer to the size of a pore that is available for $CO_2$ entry into or out from the pore, such as for the purposes of sorption, and can account for the presence of one or more functionalizing moieties within the pore. As will be understood, a mesoporous structure can include pores with a distribution of sizes, in which case an effective pore size can refer to a mean size of the pores. A smaller pore size can be advantageous in some embodiments, by allowing closer proximity between $CO_2$ and functionalizing moieties to promote capture of $CO_2$ by the functionalizing moieties, while the pore size should be sufficient to allow low diffusional resistance to $CO_2$. Diffusional resistance also can be reduced by tuning a connectivity (or a tortuosity) of pores, where a tortuosity factor can be, for example, represented as a ratio of (1) an actual path distance through interconnected pores across a thickness of a mesoporous structure relative to (2) the thickness of the mesoporous structure, and can be up to about 5, up to about 4.5, up to about 4, up to about 3.5, up to about 3, up to about 2.5, up to about 2, up to about 1.9, up to about 1.8, or up to about 1.7, and down to about 1.5, down to about 1.4, down to about 1.3, or less.

In some embodiments, a mesoporous structure has a high $CO_2$ sorption capacity. A high $CO_2$ sorption capacity can be advantageous in some embodiments, by reducing energy and capital costs of large-scale $CO_2$ capture, since it reduces the amount of sorbent to capture and release a given amount of $CO_2$. In some embodiments, $CO_2$ sorption capacity of the mesoporous structure under dry conditions (e.g., less than about 2.3% (by moles) of $H_2O$, such as about 2%, about 1%, about 0.1%, or less, and about 40° C.) is at least about 0.3 mmol $CO_2$/g of sorbent, at least about 0.4 mmol $CO_2$/g of sorbent, at least about 0.5 mmol $CO_2$/g of sorbent, at least about 0.6 mmol $CO_2$/g of sorbent, at least about 0.7 mmol $CO_2$/g of sorbent, at least about 0.8 mmol $CO_2$/g of sorbent, at least about 0.9 mmol $CO_2$/g of sorbent, at least about 1 mmol $CO_2$/g of sorbent, at least about 1.1 mmol $CO_2$/g of sorbent, at least about 1.2 mmol $CO_2$/g of sorbent, at least about 1.3 mmol $CO_2$/g of sorbent, at least about 1.4 mmol $CO_2$/g of sorbent, at least about 1.5 mmol $CO_2$/g of sorbent, at least about 1.6 mmol $CO_2$/g of sorbent, at least about 1.7 mmol $CO_2$/g of sorbent, at least about 1.8 mmol $CO_2$/g of sorbent, at least about 1.9 mmol $CO_2$/g of sorbent, or at least about 2 mmol $CO_2$/g of sorbent, and up to about 2.5 mmol $CO_2$/g of sorbent, up to about 3 mmol $CO_2$/g of sorbent, or more.

In some embodiments, a mesoporous structure has a high selectivity for $CO_2$ over other gases potentially present in a flue gas stream, such as $N_2$, $H_2O$, HCl, $SO_2$, $SO_3$, NO and $NO_2$. This selectivity can be advantageous in some embodiments, by allowing for an efficient and cost-effective separation process. In some embodiment, a high selectivity for $CO_2$ over $H_2O$ can be expressed in terms of $CO_2$ sorption capacity of the mesoporous structure under humid conditions (e.g., at least about 2.3% (by moles) of $H_2O$, such as about 2.3%, about 5%, about 10%, about 15%, about 20%, or more, and about 40° C.) relative to $CO_2$ sorption capacity of the mesoporous structure under dry conditions, where $CO_2$ sorption capacity under humid conditions is at least about 30%, at least about 40%, at least about 50%, at least about 60%, at least about 70%, at least about 80%, or at least about 85%, and up to about 90%, up to about 95%, up to about 98%, or more, relative to $CO_2$ sorption capacity under dry conditions.

In some embodiments, a mesoporous structure has a concentration of zinc atoms (or a concentration of functionalizing moieties) of at least about 1 mmol/g of sorbent, at least about 1.1 mmol/g of sorbent, at least about 1.2 mmol/g of sorbent, at least about 1.3 mmol/g of sorbent, at least about 1.4 mmol/g of sorbent, at least about 1.5 mmol/g of sorbent, at least about 1.6 mmol/g of sorbent, at least about 1.7 mmol/g of sorbent, at least about 1.8 mmol/g of sorbent, at least about 1.9 mmol/g of sorbent, at least about 2 mmol/g of sorbent, or at least about 2.5 mmol/g of sorbent, and up to about 3 mmol/g of sorbent, or more.

In some embodiments, a support includes mesoporous carbon. In some embodiments, the mesoporous carbon is ordered mesoporous carbon. In some embodiments, the ordered mesoporous carbon is hexagonal mesoporous carbon. In some embodiments, a support includes a mesoporous graphene support. In some embodiments, the graphene support is a three-dimensional foam with micron-sized and smaller pores. In some embodiments, the graphene is a multi-layered graphene. In some embodiments, a support includes mesoporous silica. In some embodiments, a support has one or more functionalizing moieties bound thereto, and each functionalizing moiety includes a zinc atom or an amine, such as aniline.

In some embodiments, provided herein is a composition including $CO_2$ adsorbed to a mesoporous structure provided herein.

In some embodiments, provided herein is a method of adsorption of $CO_2$ including contacting a mesoporous structure provided herein with $CO_2$. In some embodiments, the $CO_2$ is part of a flue gas emanating from a coal or natural gas burning thermal power plant.

In some embodiments, provided herein is a method of desorption of $CO_2$ from a composition including $CO_2$ adsorbed to a mesoporous structure provided herein, where the method includes heating the composition at a temperature of up to about 100° C., up to about 90° C., up to about 80° C., up to about 70° C., up to about 60° C., up to about 50° C., or up to about 40° C. In some embodiments, at least about 50% of adsorbed $CO_2$ is released at a temperature of about 40° C., such as at least about 60%, at least about 70%, at least about 80%, or at least about 85%, and up to about 90%, up to about 95%, or more. In some embodiments, at least about 55% of adsorbed $CO_2$ is released at a temperature of about 50° C., such as at least about 65%, at least about 75%, at least about 85%, or at least about 90%, and up to about 95%, up to about 98%, or more. In some embodiments, at least about 60% of adsorbed $CO_2$ is released at a temperature of about 60° C., such as at least about 70%, at least about 80%, at least about 90%, or at least about 95%, and up to about 98%, up to about 99%, or more. Alternatively, or in conjunction, desorption of $CO_2$ can be performed by applying a low pressure or a vacuum (e.g., a pressure of about 200 torr or less, about 100 torr or less, about 50 torr or less, about 10 torr or less, about 1 torr or less, about 0.1 torr or less, or about 0.03 torr) or other changes in environmental conditions.

In some embodiments, a mesoporous structure provided herein is a biomimetic sorbent that mimics the body's natural enzyme, carbonic anhydrase, which is responsible for hydrating and dehydrating $CO_2$ catalytically. In some embodiments, carbon-based supports are chemically functionalized with zinc to remove $CO_2$ from a flue gas that contains a substantial amount of water vapor. For example, water vapor can constitute about 10-12% (by moles) of the flue gas in a coal-fired process, and an even higher percentage of the flue gas in a natural gas fired process. Since $CO_2$ binding strength of zinc can be tuned on a carbon surface, such as through the addition of carbon-based functional groups or other functionalizing moieties, in some embodiments, this implies tunability in the sorption kinetics. In some embodiments, with a carbon-based sorbent provided herein, the sorbent is contemplated to have a reduced heat of regeneration compared to water.

In some embodiments, a mesoporous structure includes a support that includes, is surface functionalized with, or is impregnated with carbonic anhydrase or another metalloenzyme that can catalyze conversion of carbon dioxide to bicarbonate and vice versa. An active site of carbonic anhydrase typically includes a zinc cation (e.g., $Zn^{2+}$). Examples of carbonic anhydrase include α-carbonic anhydrase, β-carbonic anhydrase, γ-carbonic anhydrase, δ-carbonic anhydrase, and ε-carbonic anhydrase.

In some embodiments, also provided herein are methods of forming mesoporous structures provided herein. In some embodiments, a method includes functionalizing mesoporous carbon support with an azide functionality to provide an azide functionalized mesoporous carbon support, reacting the azide functionalized mesoporous carbon support with a terminal alkyne substituted ligand suitable for zinc binding to provide a mesoporous carbon support functionalized with a zinc binding ligand, and reacting the mesoporous carbon support functionalized with the zinc binding ligand with a zinc cation (e.g., $Zn^{2+}$) or a zinc-containing complex or moiety to provide a mesoporous structure.

In some embodiments, a method includes impregnating or infiltrating a mesoporous carbon support with carbonic anhydrase or another metalloenzyme to provide a mesoporous structure.

Mesoporous Carbon Support (MCS)

A number of procedures can be used for the synthesis of MCS and ordered MCS of some embodiments of this disclosure, such as according to the procedures set forth in Kim, J. et al., "Direct synthesis of uniform mesoporous carbons from the carbonization of as-synthesized silica/triblock copolymer nanocomposites," Carbon, 2004, 42 (12-13), 2711-2719 and Yuan et al., "Highly Ordered Mesoporous Carbon Synthesized via in Situ Template for Supercapacitors," Int. J. Electrochem. Sci., 2009, 4 (4), 562-570. In some embodiments, a procedure uses triblock copolymers to template the synthesis of ordered mesoporous silica. For preparing MCS, mesoporous silica can be used as a hard template, which is subsequently filled with a carbon source material, followed by carbonization and removal of the template. A triblock copolymer can be used both as the template for forming an ordered structure and the carbon source. This procedure can be further enhanced by including an additional carbon source, such as sucrose, together with the triblock copolymer. This modified procedure is contemplated to result in a higher surface area and a more complete conversion of the carbon source.

In some embodiments, a MCS is prepared using the procedures set forth in Kim and Yuan referenced above. In some embodiments, to tune a pore size, triblock copolymers of different sizes are used. In some embodiments, the MCS has a pore size between about 4.6 nm to about 30 nm, although other pores sizes smaller than about 4.6 nm or greater than about 30 nm can be attained. Such MCS can be prepared by adapting the procedure of Zhao, D. et al., "Triblock copolymer syntheses of mesoporous silica with periodic 50 to 300 angstrom pores," Science, 1998, 279 (5350), 548-552, by controlling a block ratio between poly(ethylene oxide) and polypropylene oxide), which are commercially available from BASF Chemical Co.

A number of techniques, such as Fourier Transform Infrared (FTIR) Spectroscopy and X-ray Photoelectron Spectroscopy (XPS), can be used to characterize chemical functional groups on a MCS surface to ensure formation of the MCS.

As to graphene-based MCS, such MCS can be prepared by, for example, chemical vapor deposition (CVD) of graphene into nickel foams, such as according to the procedure set forth in Chen, Z. P. et al., "Three-dimensional flexible and conductive interconnected graphene networks grown by chemical vapor deposition," Nat. Mater., 2011, 10 (6), 424-428. As another example, graphene-based MCS can be prepared by employing mesoporous nickel template by electroplating nickel in lyotropic liquid crystalline phases of polyethylene glycol alkyl ether surfactant templates (e.g., available under the brand name Brij 56 and Brij 78), such as according to the procedure set forth in Nelson, P. A. et al., "Mesoporous Nickel/Nickel Oxide: A Nanoarchitectured Electrode," Chem. Mater. 2002, 14 (2), 524-529. Such a mesoporous nickel template can be used for CVD deposition of graphene.

Surface Functionalization of MCS

Azide Derivatization

In some embodiments, a mesoporous sorbent for $CO_2$ capture provided herein includes monomeric zinc hydroxide complexes. Such zinc moieties can be bound to a MCS through a two-stage covalent attachment strategy that involves the coupling of an organoazide to a terminal alkyne. An azide functionalized MCS is prepared by adapting the procedure set forth in Devadoss, A. et al., "Azide-modified graphitic surfaces for covalent attachment of alkyne-terminated molecules by 'click' chemistry," J. Am. Chem. Soc., 2007, 129 (17), 5370, for edge-plane graphite using iodine-azide. This reaction forms organoazides as schematically shown below:

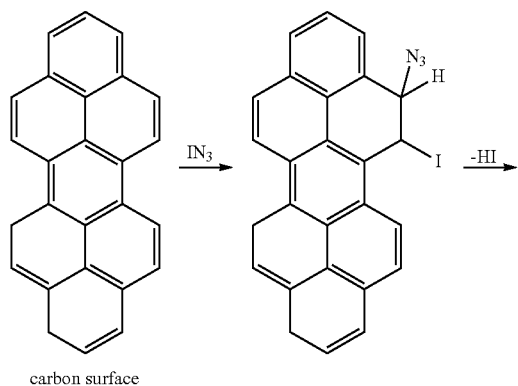

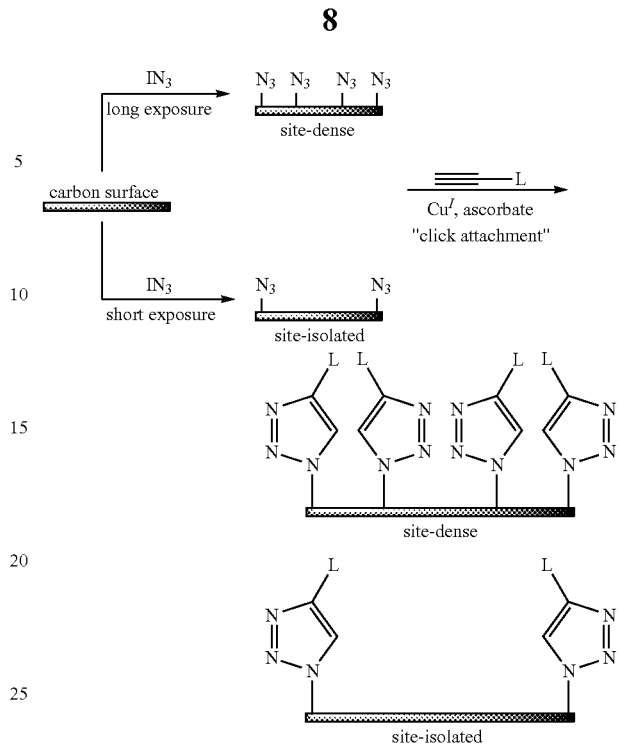

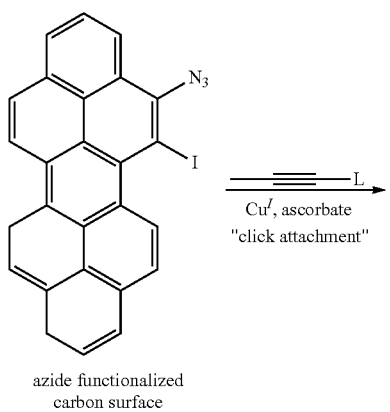

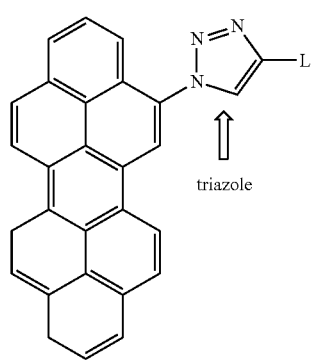

The "click" reaction is a 1,3-dipolar cycloaddition reaction between an organoazide and a terminal alkyne catalyzed by Cu(I) forming a triazole linker including a ligand L. Preparation of a MCS functionalized with site-dense and site-isolated triazoles are schematically shown below:

Various techniques can be used to confirm the triazole functionalization of the MCS. For example, X-ray Photoelectron Spectroscopy (XPS) provides information on the azide and the degree of reaction through distinct nitrogen azide features at about 400 eV and about 404 eV (about 2:1 ratio). As the reaction progresses, the two XPS characteristic of the azide collapse into a single feature at about 400 eV that integrates to the total number of nitrogen atoms present in both the triazole linker and immobilized ligand L. The accessible azides within the MCS can be quantified by "click" attachment of ethylynated ferrocene (or any other suitably elementally-tagged molecule), followed by microwave-assisted acid digestion of the carbon material, and iron analysis by Inductively Coupled Plasma-Mass Spectrometry (ICP-MS). This reaction also can be followed by the characteristic azide stretch in the infrared spectrum in KBr.

Zinc Complexes

Sterically demanding, tridentate or tetradentate ligands can stabilize a monomeric, tetrahedrally-ligated zinc hydroxide moiety that exhibits $CO_2$ reactivity. For a ligand that enforces a coordination geometry of the zinc hydroxide moiety that supports reactivity with $CO_2$, the hydrated zinc complexes of azamacrocycles [12]aneN$_4$ and [12]aneN$_3$ are contemplated, as schematically shown below:

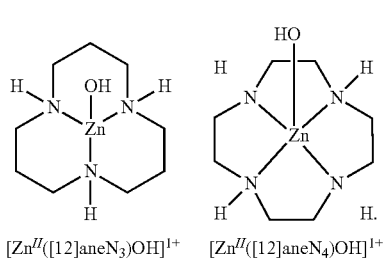

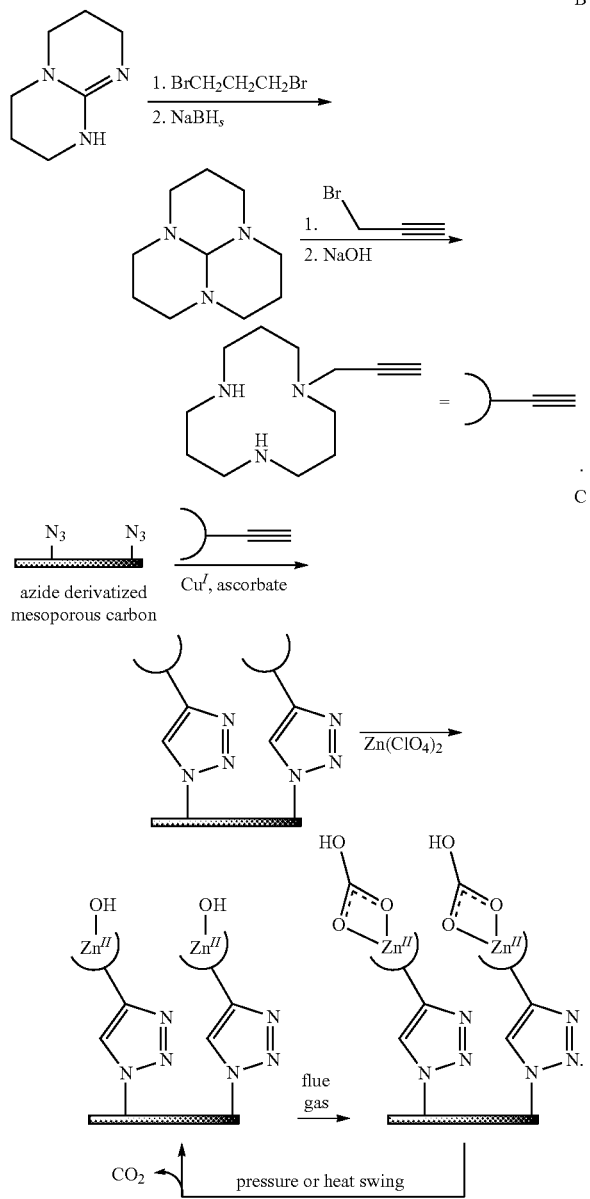

It is contemplated that an alkyne tether is introduced by alkylating a single nitrogen atom of [12]aneN$_3$ with propargyl bromide. The resulting complexes have high CO$_2$ binding rate constants. Density Functional Theory (DFT) calculations indicate that the reactions can have low activation barriers. In some embodiments, the NH groups in the ligand can stabilize bicarbonate ligation to the zinc center.

Other macrocyclic ligands are encompassed by this disclosure, including other cyclic ligands including at least one ring of nine or more total atoms, such as ten or more total atoms, eleven or more total atoms, twelve or more total atoms, thirteen or more total atoms, fourteen or more total atoms, and up to twenty or more total atoms, and including three or more potential donor atoms or groups in the ring that can coordinate to a zinc hydroxide moiety, such as four or more donor atoms or groups, five or more donor atoms or groups, or six or more donor atoms or groups, and up to eight or more donor atoms or groups. The donor atoms or groups can be selected from, for example, N atoms; secondary amine (NH) groups; primary amine (NH$_2$) groups; cyano (CN) groups; F atoms; F-containing groups; Cl atoms; Cl-containing groups; Br atoms; Br-containing groups; O atoms; hydroxyl (OH) groups, carboxyl (COOH) groups, ester (COOR) groups, and other O-containing groups; P atoms; P-containing groups; S atoms, thiol (SH) groups and other S-containing groups; and any combinations thereof. Also, more generally, other monodentate, bidentate, tridentate, tetradentate, and higher order polydentate ligands (whether cyclic or non-cyclic) that can coordinate to a zinc hydroxide moiety are encompassed by this disclosure.

Sorbent Characterization Studies

X-ray diffraction (XRD) can be used to confirm whether a MCS is ordered, indicative by a diffraction peak. Transmission electron microscopy (TEM) can be used to image the ordered structure and provide qualitative information on pore size, the MCS morphology, and pore structure. Micro-Raman techniques can be used to confirm the formation of a graphitic carbon material. FTIR and XPS can be used to characterize residual chemical groups on the MCS and to determine if carbonization has progressed to a desired extent. In addition, a gas sorption analyzer can be used to measure surface area and pore size distribution. The analyzer can operate a variety of data reduction procedures for the evaluation of collected surface area and pore structure data including Langmuir, Brunauer-Emmett-Teller (BET), and Dubinin-Astakov methods, and can be equipped to use N$_2$, CO$_2$, and Ar as probe gases.

Carbon Capture

In some embodiments, carbon capture involves separation of CO$_2$ from an exhaust gas mixture. FIG. 1 provides a schematic of CO$_2$ separation, where stream A represents a CO$_2$-containing gas mixture, stream B includes primarily CO$_2$ depending on the process purity, and stream C is a remainder of stream A including a low-level of CO$_2$. The concentration of CO$_2$ in a flue gas, or stream A, varies according to the types of emission sources, such as coal- and natural gas fired power plants. The mesoporous structures provided herein can be incorporated in a post-combustion capture device of FIG. 1. Other embodiments of capture devices are contemplated, such as in the context of pre-combustion or oxyfuel combustion.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Several surface functionalized sorbents have been synthesized and tested using silica gel or ordered mesoporous silica as sorbent supports. Measurements have been carried out on these sorbents to characterize CO$_2$ adsorption capacities and to demonstrate CO$_2$ sorption as provided herein. In addition, co-adsorption of water during CO$_2$ adsorption has been investigated, and its effects on CO$_2$ uptake capacity have been evaluated.

Materials and Methods

Brand E silica gel (230-400 mesh) was purchased from Dynamic Adsorbents, Inc. All other chemicals and organic solvents were purchased from Sigma Aldrich. p-aminophenyl phosphonic acid and the mesoporous silica (SBA-15) were synthesized according to published procedures.

The surface functionalization of silica gel was based on a modified procedure reported by Duchateau et al., "Silica-Grafted Diethylzinc and a Silsesquioxane-Based Zinc Alkyl Complex as Catalysts for the Alternating Oxirane-Carbon Dioxide Copolymerization," Organometallics, 2007, 26 (17), 4204-4211. The as-received silica gel was either dried at about 200° C. under vacuum for about 3 h (labeled as zinc silica 1) or directly used without being dried (labeled as zinc silica 2). Typically, about 2 g of silica gel was dispersed in about 10 mL anhydrous heptane, which was pretreated by activated molecular sieves with an average pore size of 4 Å. Diethyl zinc (10 mL, 1 M solution in hexane) was slowly added to the suspension, which was stirred overnight, vacuum filtered, washed with 3 doses of about 20 mL of heptane to remove unreacted diethyl zinc, and dried in vacuum for about 15 min.

To analyze the zinc loading, unmodified silica gel (about 40.7 mg), zinc silica 1 (about 39.4 mg) and zinc silica 2 (about 40.3 mg) were each extracted in about 10 mL of 1% $HNO_3$ at room temperature for about 1 h. The resulting solutions were diluted, filtered by 0.45 μm membranes, and analyzed by ICP-MS (Thermo Scientific XSERIES 2 ICP-MS). The concentrations of zinc in unmodified silica gel, zinc silica 1 and zinc silica 2 were observed to be about $3.38 \times 10^{-5}$ mmol $g^{-1}$, about 1.63 mmol $g^{-1}$ and about 1.82 mmol $g^{-1}$, respectively.

Phosphonic acid was deposited on SBA-15 by mixing about 200 mg of SBA-15 and about 60 mg (about 0.35 mmol) of p-aminophenyl phosphonic acid, which was suspended in about 30 mL anhydrous ethanol and refluxed for about 4 h. After cooling to room temperature, the precipitate was collected by filtration and washed with ethanol (2×10 mL). The solid was dried in a vacuum oven at about 60° C. for about 2 h to yield about 145 mg of silica material. The phosphonic acid loading was analyzed by digesting about 18.2 mg of SBA material in about 2 mL of 10% KOH solution and heating to completely dissolve the material. The pH was adjusted to about 1 with concentrated hydrochloric acid and diluted to about 10 mL. The concentration of phosphonic acid was then determined by absorbance with ultraviolet-visible (UV-vis) spectroscopy ($\lambda_{max}$=261 nm, $\epsilon$=208). The material was found to have a loading of about 1.22 mmol $g^{-1}$ of p-aminophenyl groups.

Breakthrough experiments were performed with packed columns ranging from about 100 mg to about 200 mg of samples. Ar was passed through a bubbler containing $H_2O$ (the bubbler is bypassed in dry experiments) at about 30 mL/min and passed through the sample column. At a designated time, about 3 mL/min of $CO_2$ was passed into the flow stream, and at the same time the flow rate of Ar was reduced to about 27 mL/min to keep the total flow rate constant. Breakthrough was measured downstream of the packed bed using an Extrel 300Max-LG quadrupole mass spectrometer (MS). Both $CO_2$ and $H_2O$ concentrations were monitored, and $CO_2$ was not sent to the bed until the $H_2O$ concentration has stabilized. Typical experimental parameters were about 10% (by moles) $CO_2$ and 2.3% (by moles) $H_2O$ with a balance of Ar. The column was held at a substantially constant temperature of about 40° C. for adsorption experiments. The column could be rapidly heated to about 130° C. for desorption measurements. The capacity of the sorbent was determined by measuring the difference between $CO_2$ breakthrough curves through an empty column and through the packed column.

Porosity and surface analysis was performed using a Quantachrome AutosorbiQ gas sorption analyzer. Each sample was outgassed at about 0.03 torr with about 1° C./min ramp to about 50° C., where the sample was held overnight and tested for continuing outgassing. If the sample was still outgassing, as measured by a pressure change, it was held at about 130° C. for up to 5 additional hours, with a test every 15 min. The sample was then held at vacuum (about 0.03 torr) until the analysis was performed. Micro and mesopore size distributions were obtained using Density Functional Theory (DFT) calculations based upon $N_2$ adsorption isotherms. Surface areas were obtained by the BET method within the pressure range of $p/p_0$=0.05-0.35.

Example 1

Zinc-Functionalized Silica Gel

Figure 2:
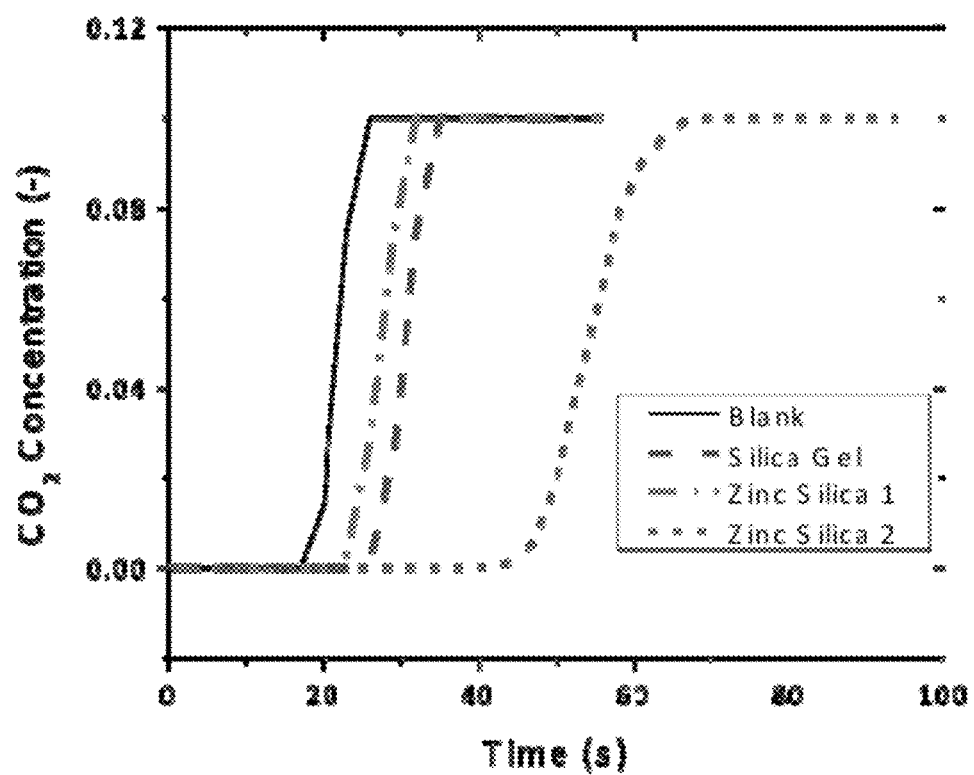
FIG. 2 graphically illustrates $CO_2$ breakthrough curves of blank silica gel, zinc silica 1 and zinc silica 2 at about 40° C. under dry conditions, according to an embodiment of this disclosure.

The $CO_2$ capacity of the synthesized zinc-functionalized silica gel was measured by the same breakthrough setup under the same conditions, namely about 10% $CO_2$ in Ar at about 40° C. under dry or humid conditions. As can be seen in FIG. 2, all three samples including silica gel, zinc silica 1 and zinc silica 2 captured $CO_2$ under relatively dry conditions without water bubbler. The $CO_2$ capacities of the sorbents obtained from the breakthrough curves were about 0.10 mmol/g, about 0.06 mmol/g and about 0.36 mmol/g for silica gel, zinc silica 1 and zinc silica 2, respectively. It can be seen that surface modification with zinc improved the $CO_2$ capacity of silica gel by about three fold in the case of zinc silica 2, while zinc silica 1 showed slightly lower capacity than silica gel.

Figure 3:
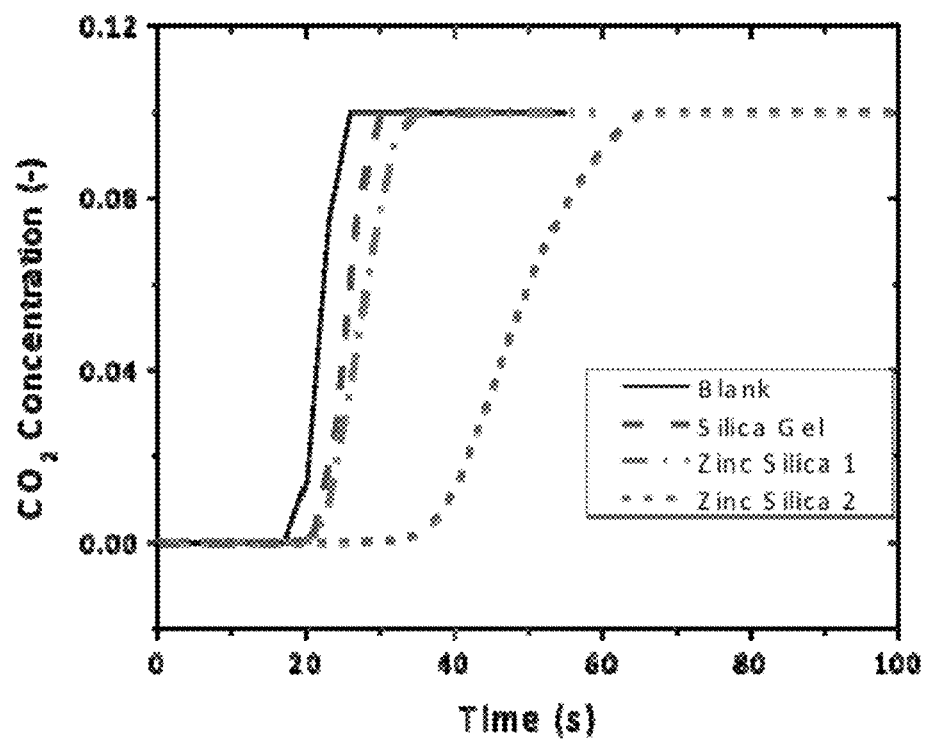
FIG. 3 graphically illustrates $CO_2$ breakthrough curves of blank silica gel, zinc silica 1 and zinc silica 2 at about 40° C. under humid conditions, according to an embodiment of this disclosure.

To simulate conditions closer to the post-combustion flue gas and evaluate the effects of water on the sorbent performance, the zinc-functionalized silica sorbents were also tested under humid conditions. The $H_2O$ concentration was allowed to equilibrate before the column was exposed to $CO_2$. About 180 mg of each sorbent were tested and plotted in FIG. 3. All three sorbents continued to capture $CO_2$ with varied capacities, which were about 0.04 mmol/g, about 0.06 mmol/g and about 0.30 mmol/g for silica gel, zinc silica 1 and zinc silica 2, respectively.

The $CO_2$ capacity of silica gel decreased by about half compared to the capacity obtained for silica tested without water bubbler. The decrease can be attributed to the strong interaction of $H_2O$ with the silanol groups on the silica gel surfaces. Therefore, $H_2O$ molecules may preferentially adsorb on the silica gel surfaces and compete with the adsorption of $CO_2$. Interestingly, the $CO_2$ capacity of zinc silica 1 remained unchanged upon the addition of water vapor, which suggests non-negligible interactions between the surface zinc functionalities and $CO_2$.

The capacity of zinc silica 2 decreased by about 17% upon the introduction of water vapor, which might be attributed to competing adsorption of water or condensation of water blocking some of the pores or surfaces. But still, under humid conditions, zinc silica 2 exhibited a $CO_2$ capacity about 7-fold higher than that of silica gel, which indicates the preferential interactions between the surface zinc groups and $CO_2$.

The $CO_2$ capacities for silica gel, zinc silica 1 and zinc silica 2 under different conditions are summarized in Table 1. In general, zinc silica 2 showed the highest capacities, namely about 3-fold and about 7-fold higher than those of unmodified silica gel under dry and humid conditions, respectively, while zinc silica 1 exhibited similar capacities to those of the unmodified silica gel.

TABLE 1

CO$_2$ adsorption capacities of blank silica gel, zinc silica 1 and zinc silica 2 at about 40° C. under dry and humid conditions.

| Sorbent | CO$_2$ Capacity (mmol/g) | |
|---|---|---|
| | Dry | Humid |
| Blank silica gel | 0.10 | 0.04 |
| Zinc silica 1 | 0.06 | 0.06 |
| Zinc silica 2 | 0.36 | 0.30 |

Figure 4:
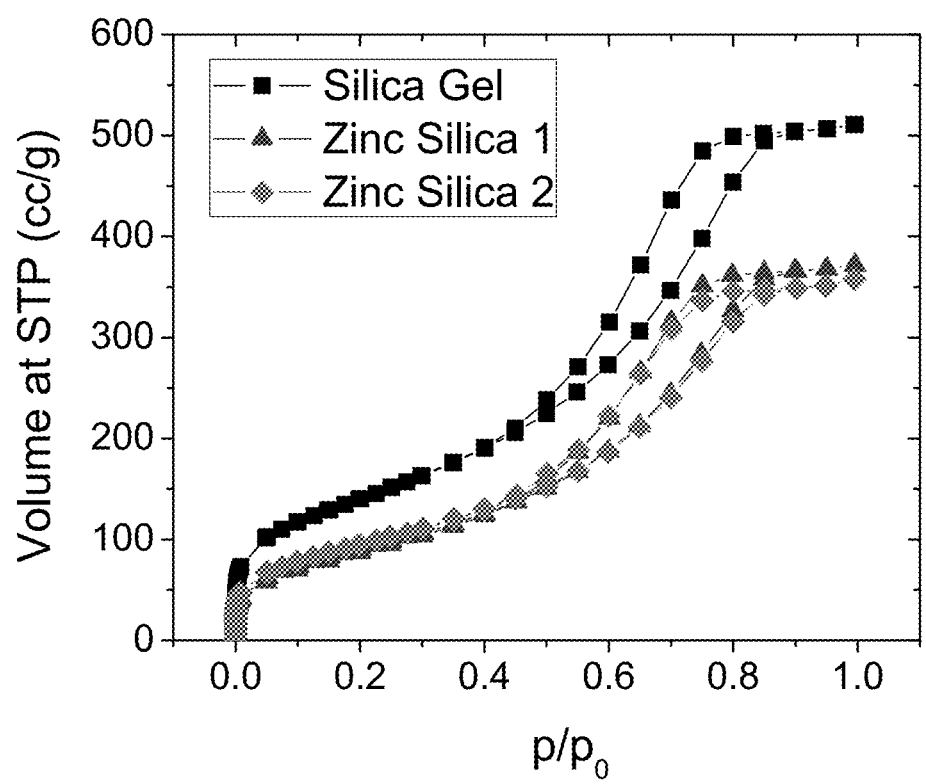
FIG. 4 graphically illustrates $N_2$ adsorption and desorption isotherms at about 77 K for silica gel, zinc silica 1 and zinc silica 2, according to an embodiment of this disclosure.

To investigate the changes in pore size and surface area due to surface modification, N$_2$ adsorption and desorption isotherms were measured at about 77 K for all three samples including silica gel, zinc silica 1 and zinc silica 2. The results are shown in FIG. 4. All three samples show type IV isotherms where the hysteresis stems from the condensation effects of the sorbate gas in mesopores. It can be seen that the samples of zinc silica 1 and 2 adsorb less N$_2$ than silica gel at the same relative pressures, suggesting a decrease in either, or both, pore volume and surface area due to surface functionalization.

Figure 5:
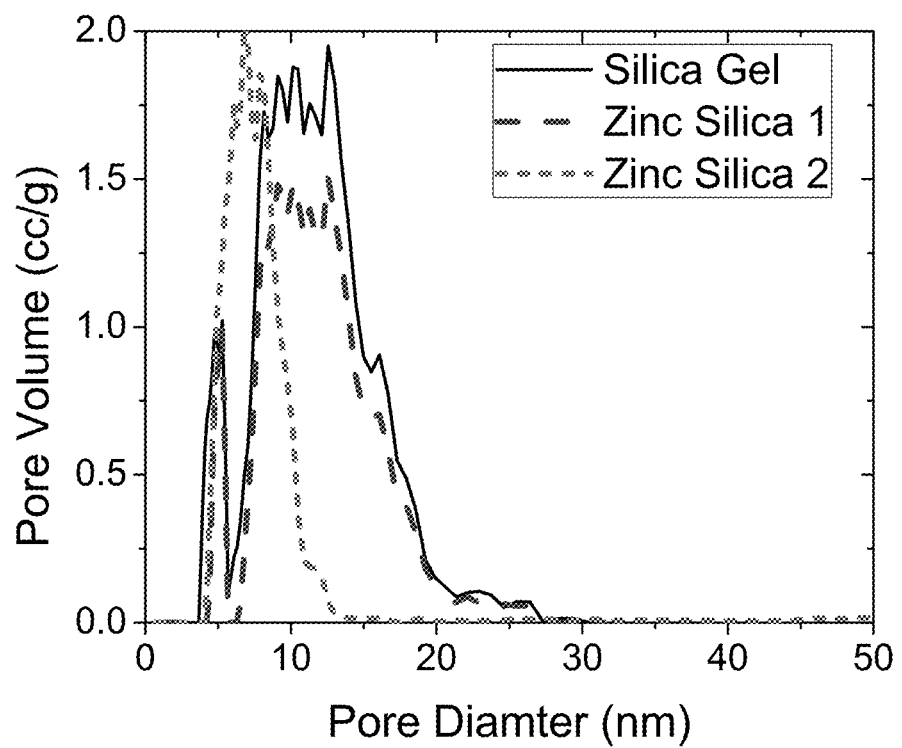
FIG. 5 graphically illustrates pore size distributions (PSD) of silica gel, zinc silica 1 and zinc silica 2, according to an embodiment of this disclosure.

Pore size distributions (PSDs) were calculated by non-local DFT (NLDFT) based upon the cylindrical and spherical silica pore adsorption model, which are shown in FIG. 5. Zinc silica 1 shows a PSD similar to that of silica gel, with a sharp peak at about 5.3 nm and a broad peak within the range of about 7-15 nm, although the broad peak for zinc silica 1 has smaller pore volume than that for silica gel. This might be because some of the mesopores were blocked during preheating or surface functionalization. However, zinc silica 2 has a different distribution with a peak at about 7 nm, which might result from the formation of zinc clusters on the pore surface during the surface functionalization process.

Furthermore, the surface areas were obtained by the BET method based upon isotherms within the relative pressure range of about 0.05-0.35. Table 2 summarizes the BET surface areas, total pore volumes and mean pore sizes by the DFT method. Upon zinc functionalization, the surface area and the total pore volume decreased by about 35% and about 27%, respectively. The samples zinc silica 1 and 2 have similar surface areas and pore volumes. Interestingly, zinc silica 1 has substantially the same mean pore size as silica gel, while zinc silica 2 has a smaller mean pore size, which is consistent with the PSD discussed previously.

TABLE 2

Summary of surface areas, pore volumes and mean pore diameters for silica gel, zinc silica 1 and zinc silica 2

| Sorbent | BET surface area (m$^2$/g) | DFT pore volume (cc/g) | DFT mean pore diameter (nm) |
|---|---|---|---|
| Blank silica gel | 510.7 | 0.75 | 12.6 |
| Zinc silica 1 | 337.8 | 0.55 | 12.6 |
| Zinc silica 2 | 348.8 | 0.53 | 6.8 |

Example 2

Aniline-Functionalized SBA-15 p-aminophenyl phosphonic acid was deposited onto the surface of SBA-15. The active site for CO$_2$ adsorption is the aniline group with primary amine bonded to a phenyl group. Without being bound by theory, a lower heat of adsorption is contemplated for aniline than a primary amine without an aromatic ring. Under dry conditions CO$_2$ is contemplated to react with primary and secondary amine via the zwitterion mechanism where an acceptor for proton is involved. Typically a neighboring amine can act as a proton acceptor. With a bonded phenyl group, the amine site within the aniline group becomes more nucleophilic compared to a bare primary amine. It is contemplated that this can facilitate the zwitterion mechanism.

Figure 6:
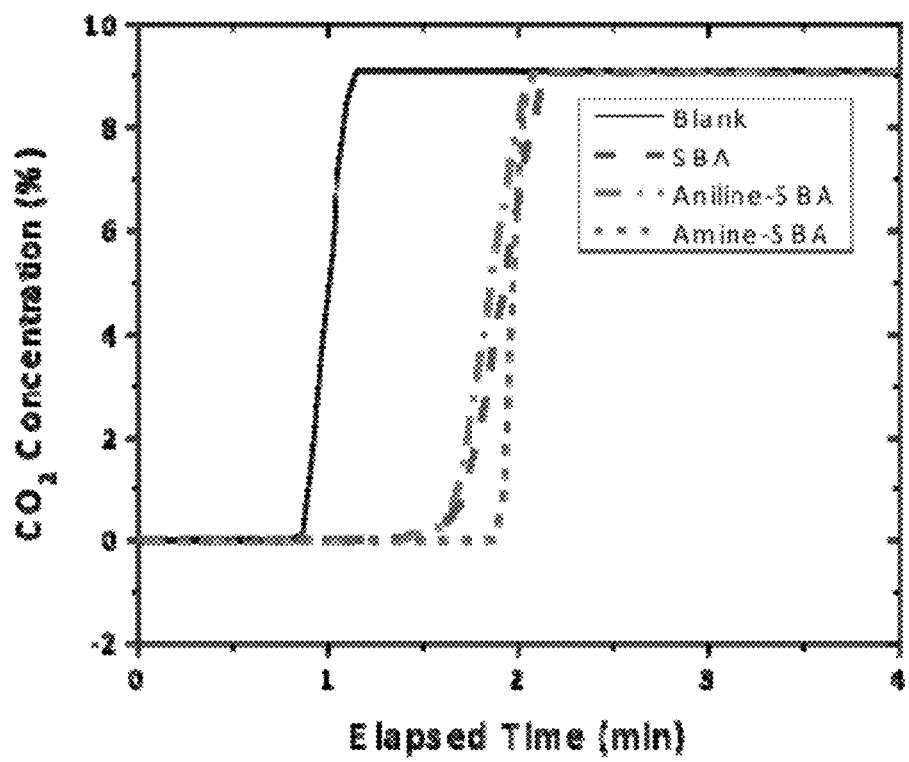
FIG. 6 graphically illustrates $CO_2$ breakthrough curves of an ordered mesoporous silica (SBA-15), aniline-modified SBA-15 and amine-modified SBA-15 at about 40° C. under dry conditions, according to an embodiment of this disclosure.
Figure 7:
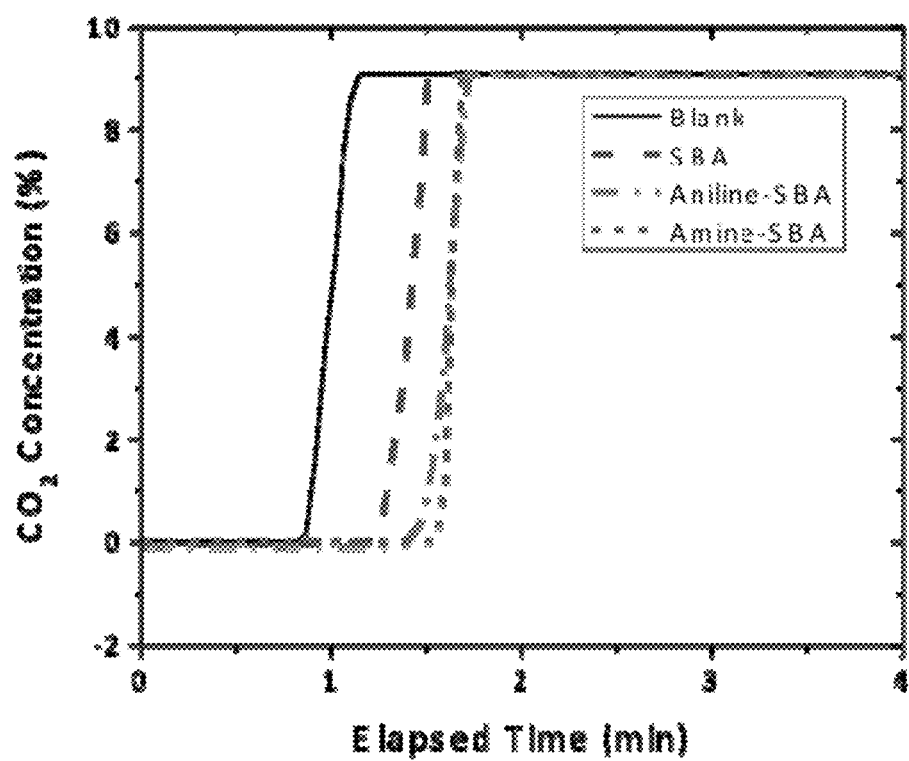
FIG. 7 graphically illustrates $CO_2$ breakthrough curves of SBA-15, aniline-modified SBA-15 and amine-modified SBA-15 at about 40° C. under humid conditions, according to an embodiment of this disclosure.

The CO$_2$ breakthrough experiments were performed at about 40° C. with aniline-modified SBA-15, amine-modified SBA-15 and unmodified SBA-15 (as a control), where the amine-modified SBA-15 was synthesized by surface reaction between (3-aminopropyl)trimethoxysilane with calcined SBA-15, according to the procedure of Hicks, J. C. et al., "Designing adsorbents for CO$_2$ capture from flue gas-hyperbranched aminosilicas capable of capturing CO$_2$ reversibly," J. Am. Chem. Soc., 2008, 130 (10), 2902-2903. Breakthrough curves under dry and humid conditions are given in FIGS. 6 and 7, respectively. The calculated capacities are summarized in Table 3.

TABLE 3

CO$_2$ adsorption capacities of SBA-15, aniline-modified SBA-15 and amine-modified SBA-15 at about 40° C. under dry and humid conditions.

| Sorbent | CO$_2$ Capacity (mmol/g) | |
|---|---|---|
| | Dry | Humid |
| SBA | 0.68 | 0.39 |
| Aniline-SBA | 0.54 | 0.51 |
| Amine-SBA | 1.09 | 0.68 |
| Amine-SBA from Hicks et al., supra | — | 0.40 |

Under dry conditions, CO$_2$ broke through at similar times in the aniline-SBA and unmodified SBA columns, while at a latest time in the amine-SBA column. Amine-SBA shows the highest capacity among the three samples. Aniline-SBA yields a slightly lower capacity than that of unmodified SBA, probably due to reduced pore size caused by the aniline groups. However, introducing water vapor into the gas flow reduced the capacity of SBA from about 0.68 mmol/g to about 0.39 mmol/g and that of amine-SBA, while that of aniline-SBA remained almost unchanged. This indicates that under humid conditions, CO$_2$ preferentially interacts with the surface aniline functionalities over the silanol functionalities.

To qualitatively compare the heats of adsorption of CO$_2$ onto aniline-SBA and amine-SBA, CO$_2$ adsorption-desorption studies were performed using a Rubotherm magnetic microbalance, which is a gravimetric method measuring equilibrium sorbate loading. CO$_2$ adsorption was performed at about room temperature (about 22° C.) and about 1 bar of CO$_2$, followed by a pressure swing desorption process where about 1 bar of CO$_2$ was replaced by about 1 bar of He while the system was kept at about 22° C. Then the system was heated up to a number of temperature points ranging from about 50 to about 120° C.

Figure 8:
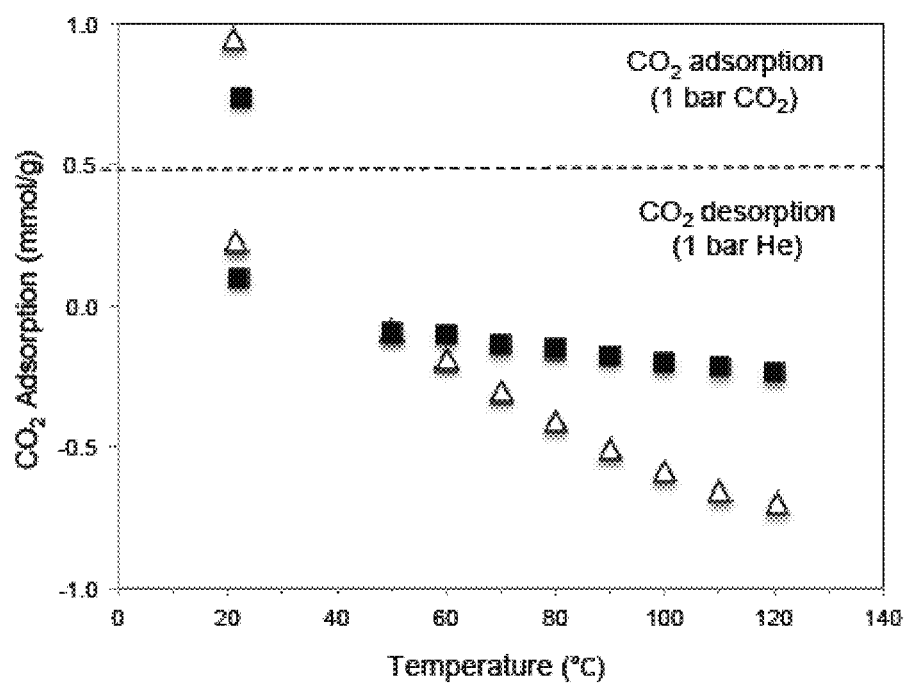
FIG. 8 graphically illustrates equilibrium $CO_2$ loadings on aniline-SBA ( ) and amine-SBA (Δ) under adsorption (above the dashed line) and desorption (below the dashed line) conditions, according to an embodiment of this disclosure.

The CO$_2$ loading amounts for each point were recorded and plotted in FIG. 8, where the rectangle and triangle shapes represent aniline-SBA and amine-SBA, respectively. The data points above the dashed line represent CO$_2$ adsorption loadings while those below the dashed line represent desorption loadings. It is contemplated that the negative loadings in FIG. 8 can stem from the sorbent losses during the vacuum and purging processes since the open sample basket is not designed for holding fine powders.

Assuming the two samples are completely regenerated under about 1 bar of He at about 120° C., namely with zero $CO_2$ loading, the equilibrium loadings of $CO_2$ under about 1 bar of $CO_2$ can be approximated by the difference in loadings under adsorption conditions and complete regeneration. Hence the equilibrium loadings on aniline-SBA and amine-SBA are obtained as about 0.98 mmol/g and about 1.65 mmol/g, respectively. It is worth noting that during the pressure swing desorption process the aniline-SBA sample released about 0.65 mmol/g of $CO_2$ and furthermore it released an additional 0.19 mmol/g of $CO_2$ from about 22° C. to about 50° C. The sorbent released about 86% of the total adsorbed $CO_2$ at the temperature of about 50° C. On the other hand, the amine-SBA sample released about 0.72 mmol/g of $CO_2$ during the pressure swing desorption. However, amine-SBA specifies a higher temperature up to about 90° C. to release about 88% of the total adsorbed $CO_2$.

Example 3

Carbonic Anhydrase-Impregnated Mesoporous Carbon

Bovine carbonic anhydrase (BCA) was purchased from Sigma Aldrich and used for impregnation into mesoporous carbon. All other reagents were also purchased from Sigma Aldrich and used without further purification. The impregnation was performed by a wetness approach modified from the procedure set forth in Vinoba, M, et al., Energy Fuels, 2011, 25, 438-445. Typically, about 10 mg of mesoporous carbon was mixed with about 2 mL of free BCA in buffer (about 3 mg/mL BCA in about 100 mM potassium phosphate, pH of about 7.0) and stirred at room temperature for about 1 h. The sample was then washed with copious amount of Tris buffer (about 50 mM, pH of about 8.0) and dried under vacuum. The resulting sample was stored at about 4° C.

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, with respect to a numerical value, the terms can refer to less than or equal to ±10% of the value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, dimensions, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a range of about 1 to about 200 should be understood to include the explicitly recited limits of about 1 and about 200, but also to include individual values such as about 2, about 3, and about 4, and sub-ranges such as about 10 to about 50, about 20 to about 100, and so forth.

The contents of the articles and other documents cited herein are hereby incorporated by reference in their entirety as if each individual document is specifically and individually indicated to be incorporated by reference.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations is not a limitation of this disclosure.

What is claimed is:

1. A sorbent comprising:
a porous support; and
functionalizing moieties bound to the porous support,
wherein each of the functionalizing moieties includes a zinc atom and a ligand to form a coordination complex with the zinc atom, and
wherein the sorbent is capable of $CO_2$ chemisorption.

2. The sorbent of claim 1, wherein the porous support includes mesoporous carbon.

3. The sorbent of claim 1, wherein the porous support includes a mesoporous oxide.

4. The sorbent of claim 1, wherein the porous support has an effective pore size in a range of 1 nm to 10 nm.

5. The sorbent of claim 1, wherein the ligand is a tridentate ligand.

6. The sorbent of claim 1, wherein the ligand is an azamacrocycle.

7. The sorbent of claim 1, wherein the ligand is bound to the porous support via a triazole linker.

8. A method of sorption of $CO_2$ comprising contacting the sorbent of claim 1 with $CO_2$.

9. The method of claim 8, wherein the $CO_2$ is part of a flue gas emanating from a coal or natural gas burning power plant.

10. The method of claim 8, further comprising performing desorption of $CO_2$ from the sorbent, by heating the sorbent at a temperature up to 80° C.

11. The method of claim 10, wherein heating is carried out at a temperature up to 60° C.

12. The method of claim 10, wherein heating is carried out at a temperature up to 40° C.

13. The sorbent of claim 1, wherein the porous support includes mesoporous silica.

14. The sorbent of claim 1, wherein the porous support includes hexagonal mesoporous carbon.

15. The sorbent of claim 1, wherein the porous support includes graphene.

* * * * *